(12) United States Patent
Knee

(10) Patent No.: US 10,609,328 B2
(45) Date of Patent: Mar. 31, 2020

(54) VIDEO PROCESSING USING A ONE-DIMENSIONAL CONTROL FUNCTION TO CONTROL PROCESSING TIME AND ERROR

(71) Applicant: GRASS VALLEY LIMITED, Newbury, Berkshire (GB)

(72) Inventor: Michael James Knee, Petersfield (GB)

(73) Assignee: GRASS VALLEY LIMITED, Newbury, Berkshire (GB)

( * ) Notice: Subject to any disclaimer, the term of this patent is extended or adjusted under 35 U.S.C. 154(b) by 30 days.

(21) Appl. No.: 15/970,358

(22) Filed: May 3, 2018

(65) Prior Publication Data

US 2018/0255271 A1  Sep. 6, 2018

Related U.S. Application Data

(63) Continuation-in-part of application No. 14/276,809, filed on Feb. 13, 2014, now abandoned.

(30) Foreign Application Priority Data

May 13, 2013 (GB) .................................. 1308581.6

(51) Int. Cl.
*G06F 17/10* (2006.01)
*H04N 7/01* (2006.01)

(52) U.S. Cl.
CPC .................................. *H04N 7/014* (2013.01)

(58) Field of Classification Search
CPC ........................................................ H04N 7/014
USPC ............................................................. 703/2
See application file for complete search history.

(56) References Cited

FOREIGN PATENT DOCUMENTS

WO          8705769 A1     9/1987
WO      2008000071 A1     1/2008

OTHER PUBLICATIONS

Kioustelidis, J.B., "Monotonicity of the Error of the Optimal Segmented Approximations", 1982, Computing, vol. 28, pp. 69-74.
United Kingdom Patent Application No. GB 1308581.6 Search Report, dated Nov. 11, 2013 (1 page).
United Kingdom Patent Application No. GB 1308581.6 Search Report, dated Mar. 7, 2014 (1 page).

*Primary Examiner* — Hugh M Jones
(74) *Attorney, Agent, or Firm* — Arent Fox LLP

(57) ABSTRACT

A video process is controlled through a one-dimensional control function to affect the two outcomes of processing time and processing error. Points are generated in error/time space corresponding to multiple combinations of parameter values applied to the process using reference input data. A subset of points is selecting in which each point is such that all other points in the space have either a higher error or a higher time, to define the one-dimensional control function.

17 Claims, 5 Drawing Sheets

| Knob setting | Parameter Values | | | | | | |
|---|---|---|---|---|---|---|---|
| | Parameter 1 | Parameter 2 | Parameter 3 | Parameter 4 | Parameter 5 | Parameter 6 | Parameter 7 |
| 0 | 0 | 0 | 0 | 0 | 0 | 0 | 0 |
| 1 | 0 | 1 | 0 | 0 | 0 | 0 | 0 |
| 2 | 0 | 0 | 1 | 0 | 0 | 0 | 1 |
| 3 | 0 | 0 | 2 | 0 | 0 | 0 | 1 |
| 4 | 0 | 0 | 2 | 0 | 1 | 0 | 1 |
| 5 | 0 | 0 | 2 | 0 | 1 | 1 | 1 |
| 6 | 2 | 0 | 2 | 0 | 1 | 1 | 1 |
| 7 | 2 | 1 | 2 | 1 | 1 | 1 | 1 |
| 8 | 2 | 2 | 2 | 1 | 1 | 1 | 1 |
| 9 | 2 | 3 | 2 | 1 | 1 | 1 | 1 |
| 10 | 2 | 3 | 2 | 1 | 2 | 1 | 1 |
| 11 | 2 | 3 | 2 | 2 | 2 | 1 | 1 |

Figure 5

| Knob setting | Parameter Values | | | | | | |
|---|---|---|---|---|---|---|---|
| | Parameter 1 | Parameter 2 | Parameter 3 | Parameter 4 | Parameter 5 | Parameter 6 | Parameter 7 |
| 0 | 0 | 0 | 0 | 0 | 0 | 0 | 0 |
| 1 | 0 | 1 | 0 | 0 | 0 | 0 | 1 |
| 2 | 0 | 1 | 1 | 0 | 0 | 0 | 1 |
| 3 | 0 | 1 | 2 | 0 | 0 | 0 | 1 |
| 4 | 0 | 1 | 2 | 0 | 1 | 0 | 1 |
| 5 | 0 | 1 | 2 | 0 | 1 | 1 | 1 |
| 6 | 2 | 1 | 2 | 0 | 1 | 1 | 1 |
| 7 | 2 | 1 | 2 | 1 | 1 | 1 | 1 |
| 8 | 2 | 2 | 2 | 1 | 1 | 1 | 1 |
| 9 | 2 | 3 | 2 | 1 | 1 | 1 | 1 |
| 10 | 2 | 3 | 2 | 1 | 2 | 1 | 1 |
| 11 | 2 | 3 | 2 | 2 | 2 | 1 | 1 |

Figure 6

VIDEO PROCESSING USING A ONE-DIMENSIONAL CONTROL FUNCTION TO CONTROL PROCESSING TIME AND ERROR

FIELD OF INVENTION

This invention concerns the control of video processing.

BACKGROUND OF THE INVENTION

This invention concerns the control of a video process having control parameters that affect both the performance of the process and its processing time. An example of such a process is a motion compensated video standards converter such as the one described in WO 87/05769. Standards converters are required to operate on a wide range of picture material, from static pictures which do not require the capabilities of motion compensation, to complex, fast-moving material which may cause problems for the best-performing motion compensated algorithms.

In a motion compensated standards converter, several parameters affect the performance of the system, for example the number of local candidate motion vectors, the block size, the number of global candidate vectors, and the use or otherwise of vector post-processing.

The first implementations of such standards converters were as dedicated hardware. A design decision would have to be made on the parameters on the bases of cost and of performance on the most demanding input picture material. Having been fixed, these parameters would be applied all the time, even to less demanding material.

More recently, it has become commonplace to implement algorithms such as motion compensated standards conversion in software, either with file-to-file processing or in real-time streaming. With file-based working in particular, there can be benefit in adapting the hitherto fixed design parameters. Processing time can be reduced by selecting parameters that lead to less complex processing. A configuration of control parameters that is required for acceptable performance on demanding input data may lead to a greater than necessary processing time for less demanding data. It is therefore useful to vary the parameters in dependence on the input data to optimize the tradeoff between time and performance over a large ensemble of input data. This is an extremely difficult problem, involving the separate adjustment of several parameters for each section of input data.

It will be understood that "processing time" will depend upon the speed and capacity of the available processing hardware. If the processing time of a specific process can be reduced, advantage can be gained in many ways. The output of the process might be available proportionately more quickly. Within a real-time constraint, a process not previously available (at a particular level of performance) may now be able to be used. Similarly, it may be possible to operate a process in a limited processing capability that would otherwise not be practicable.

Several known processes reduce the dimensionality of the problem by defining rules for the adjustment of input parameters in dependence on a reduced number of parameters. An example of this is a car engine, which internally controls a set of parameters including ignition timing, fuel/air mix, fuel injection event timing, valve timing and, in the case of automatic transmission, gear ratio, as a function of a few user inputs, the position and possibly the rate of depression of the accelerator pedal. A second example is a video compression system, where a user's selection of bit rate will control "hidden" parameters such as buffer size, subsampling ratios and DCT coefficient precision.

With reduced control dimensionality, it is still necessary to optimize the global performance/cost tradeoff. In some cases, this is a relatively simple matter. For example, a central heating system can be controlled by a thermostat that simply switches it off when it is not needed. For more complex systems, such as a video standards converter, it is necessary to estimate the effect of different control settings on widely varying inputs.

SUMMARY OF THE INVENTION

It is an object of the present invention to provide a method and apparatus for control of a video process in which the selection of parameters providing an optimum trade-off between performance and processing time, is much simplified.

BRIEF DESCRIPTION OF THE DRAWINGS

A control system according to the invention will now be described with reference to the drawings in which:

FIG. 5 is a table describing a performance knob
FIG. 6 is a table describing a feature-monotonic performance knob

DETAILED DESCRIPTION OF THE INVENTION

Figure 1:
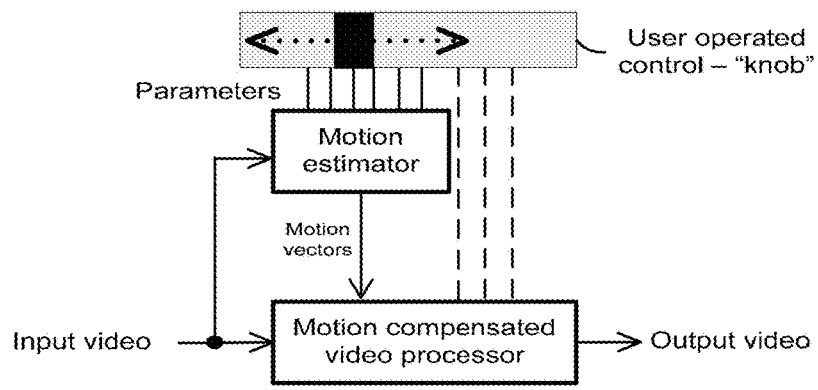
FIG. 1 is a schematic diagram of the invention

FIG. 1 illustrates an arrangement in which an input video signal is provided both to a motion compensated video processor and to a motion estimator which provides the necessary motion vectors for the processor. The motion compensated processor will in some cases be a video standards converter or an interpolator, but a wide variety of other motion compensated processors can also benefit from use of the techniques disclosed here.

The motion estimator may take a wide variety of forms well known to the skilled reader. In one embodiment, the motion estimator employs the known technique of phase correlation.

It will be understood that the functionality of a motion estimator can generally be optimized for particular content and/or or commercial constraints through a variety of parameters. These parameters may include: block size; vector constraints; number of vectors tested; number of global vectors; vector resolution; use or not of vector post-processing and many others. Some of these parameters may be fixed in a design phase but some are often made available to the user for optimization in the field. In some cases, as shown in dotted outline in FIG. 1, parameters in the motion compensated processor—as well as or instead of parameters in the motion estimator—may be variable. Indeed, the video processor will not—in certain applications—be motion compensated.

Where a number of parameters are available to be varied, an optimization procedure which provides an optimum trade-off between performance and time, is likely to be both complex and time-consuming.

According to one aspect of this invention, there is provided a user operated control which has one degree of freedom. This is represented schematically in FIG. 1 as a slider movable to the left or the right, but may take other forms such as a rotational knob. The user operated control may of course be provided through a graphical user interface; what is important is that it is a one dimensional control, that is to say having one degree of freedom.

For simplicity, the user operated control will now—without loss of generality—be referred to as a knob.

Different values of the control variable (as selected by the position of the knob) are associated in a control function with different sub-sets of control parameters. FIG. 5, for example shows a different sub-set of control parameters for each of knob settings 0 to 11. In a manner which will be described in more detail, it is arranged that increasing values of the control variable result in monotonically decreasing process errors and monotonically increasing time to process a given volume of input video.

Specifically, the control function is defined in a set-up phase using reference video content. The process is run multiple times with different permutations of the parameters and measurements taken of the time taken to complete the process and the accuracy (or other performance measure) of the process. The control function is then defined by:

generating points in error/time space corresponding to multiple combinations of parameter values applied to reference input video applied to the process, selecting a subset of points in which each point is such that all other points in the space have either a higher error or a higher time, and associating with the values of a control variable only those combinations of parameter values corresponding to the selected subset.

In this way, it is ensured that turning the knob in one direction will vary the parameters in a way which improves the performance of the process, whilst turning the knob in the other direction will reduce the processing time (whilst maintaining performance as much as practicable.

Whilst the example has been taken here of a motion compensated processor, it will be understood that the invention can be applied to other forms of video processor.

Figure 2:
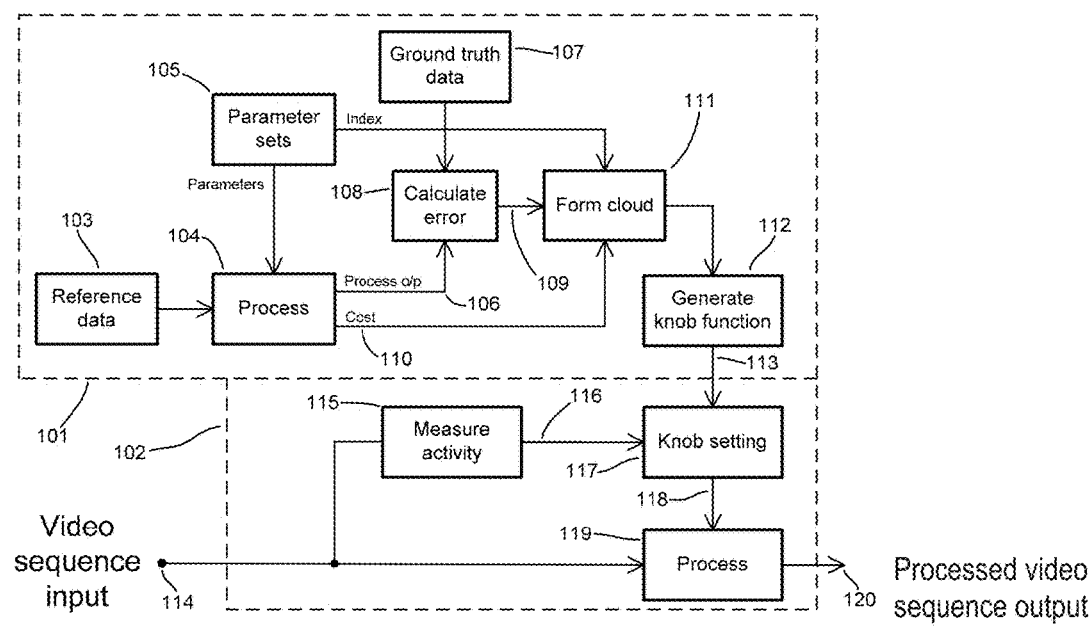
FIG. 2 is a block diagram of the invention.

Now in more detail, and referring to FIG. 2, a control system according to the invention is implemented in two stages, which are depicted in the two parts (101, 102) of the diagram. The first part (101), to be referred to as the "setup phase", is implemented in advance on reference data. In this phase pre-selected input data is operated on according to implementations of the process that is to be controlled. The output of the setup phase (101) is a "knob function" which is then used in the second part (102), to be referred to as the "main processing phase", on the actual input data.

The setup phase (101) will now be described. Stored representative reference data (103) is applied repeatedly to an implementation of the process to be controlled (104). For the purposes of this description, the process (104) is taken to be a motion compensated video interpolator, but the invention may be applied to any process acting on data in accordance with one or more control parameters. The process (104) is controlled by several sets of values of parameters taken, one set at a time, from a store (105). The parameters are chosen to be those likely to affect both the performance of the algorithm and the processing time, both of which are described later in this document. Parameters that affect only the performance, for example gain factors or other constants in arithmetical operations, are not included but would be expected to have been optimized separately.

Examples of suitable parameters to be varied in the setup phase of a motion compensated video interpolation process are: numbers of candidate vectors at different block sizes, the number of global motion vector candidates, the number of hierarchical levels in a picture builder, the size and type of a vector assignment filter, and the presence or otherwise of a motion vector post-processing operation.

Depending on the resources available, the parameter set store (105) may contain every possible combination (between defined limits) of values of the chosen parameters, or a subset of those combinations chosen either at random or with reference to prior knowledge about which combinations are likely to be efficient. In the remainder of this description, the term "parameter set" refers to a set of values of the chosen parameters.

Each repetition of the process (104) produces a respective process output (106) which is evaluated by comparing it with stored "ideal" or "ground truth" data (107). For example, in the case of video interpolation, the reference data (103) and ground truth data (107) may consist respectively of even and odd-numbered frames taken from a high-frame-rate source. The process (104) would in this case be aiming to reproduce the odd-numbered frames by interpolating between even-numbered frames.

Each version of the process output (106) is compared with the ground truth (107) in an error calculation circuit (108) which calculates an error output (109) that represents a measure of the performance of the process (104) for the respective parameter set used in that repetition of the process (104). For example, a suitable error is the root mean square difference between the ground truth data (107) and the respective process output (106). The resulting error (109) for each parameter set is applied to the circuit labelled "Form cloud" (111).

Each repetition of the process (104) also generates a "processing time" value (110). This value may be the actual processing time in seconds, but may also incorporate information about the number of processors used or the total processing time aggregated across all the processors used. In the remainder of this description, the term "processing time" should be taken to include these wider definitions of processing time.

Figure 3:
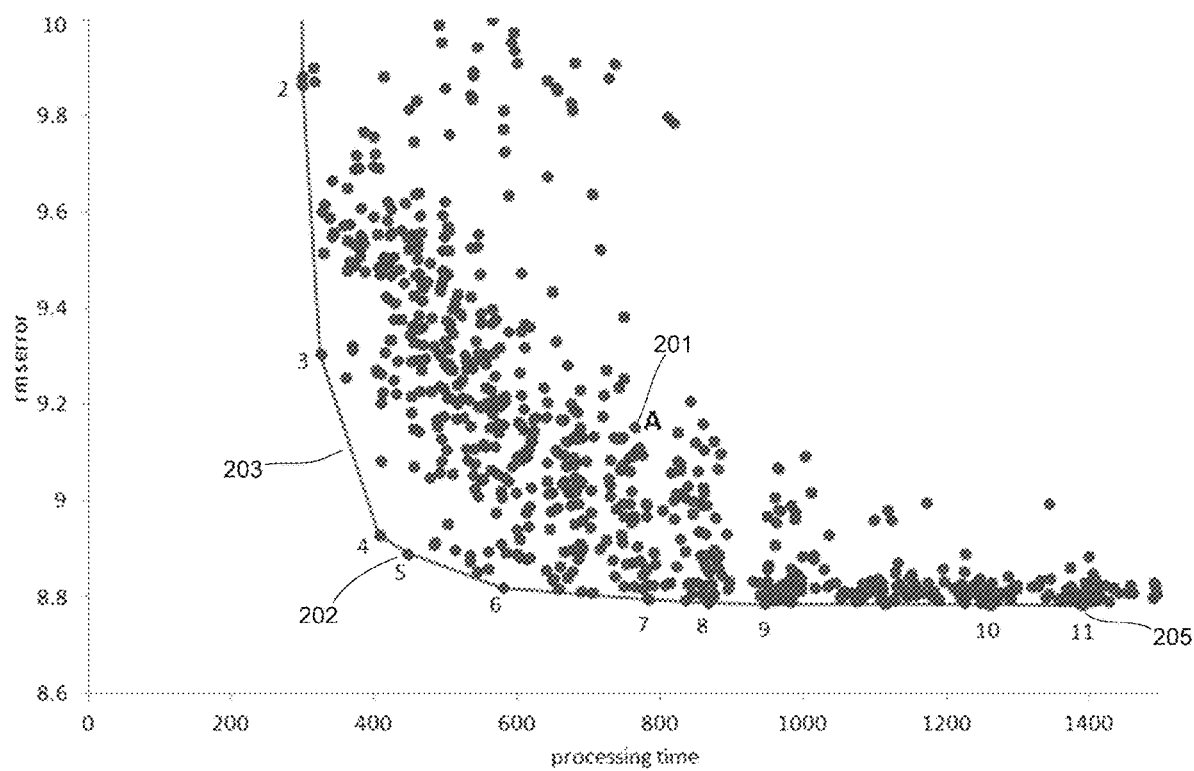
FIG. 3 is an example of a performance/time cloud

For each member of the parameter sets (105) there is now an error value (109) and a processing time value (110). These pairs of values are stored together as a "cloud" of points in two-dimensional space. Each point in the cloud is indexed with an index value from the parameter sets (105) so that it may be associated with the specific parameter set that created it. The indexed cloud of points is stored in the Form cloud circuit (111). An example of a scatter plot giving a visual representation of such a "cloud" is given in FIG. 3. In FIG. 3, the X-axis represents the processing time and the Y-axis represents the RMS error.

It will be seen from the scatter plot of FIG. 3 that some of the parameter sets are clearly more efficient than others. This applies even if the relative importance given to error and to processing time is unknown or unspecified. For example, the point labelled A (201) in FIG. 3 has a greater error and a higher processing time than the point labelled 5 (202). The goal of the first part (101) of the invention is to find an efficient subset of parameter sets, or points on the scatter plot, that traverses the range of processing times and errors. Point 5 (202) is clearly preferable to point A (201) in this respect.

FIG. 3 also shows a labelled subset of points that meets the stated goal. This subset of points is linked by the piece-wise linear curve (203) in the figure and has the following properties:

each point in the subset is such that all other points have, by comparison with it, either a higher error or a longer processing time;

the subset is convex, meaning here that the gradient between pairs of adjacent points is monotonic.

The benefit of the first property is that the subset is very efficient. The benefits of the second property are that the subset is of minimal size to meet the first property and also that there is a simple, deterministic algorithm to find its constituent points. This algorithm works as follows:

Start at the point with the shortest processing time. (This point is above and outside the region shown in FIG. 3.)

The next point in the subset is the one for which the absolute gradient of the line joining the current and next points is a maximum, subject to its error value being less than that of the current point. This becomes the new current point.

Continue to the point (205) with the lowest error.

The subset of points can be thought of as a one-dimensional "knob" (referred to henceforth as a "knob function") that controls the tradeoff between processing time and error. The problem of controlling many parameters has been replaced by choosing from the ordered subset of points comprising the knob function.

Control may be effected to aim for a desired maximum processing time or for a desired maximum error.

Returning to FIG. 2, the ordered sequence comprising the sets of parameter values for each knob setting is stored in a knob function circuit (112) and output to the main phase (102) via the connection (113).

Other knob functions are possible. For example, the property of convexity may be relaxed, while retaining the property that all points in the knob function are better in one or more respects (processing time or error) than each of the other points. This can be useful if there are large gaps between adjacent points in the convex knob function.

Figure 4:
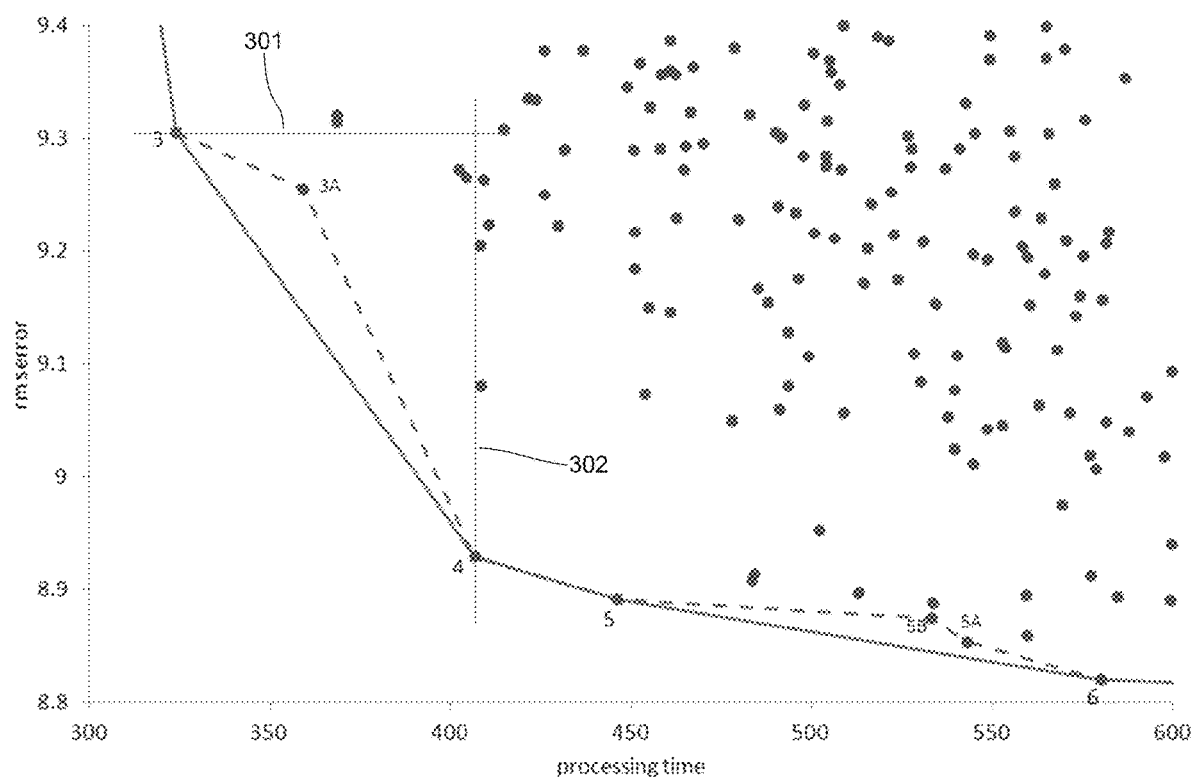
FIG. 4 shows a detail of the performance/time cloud and illustrates convex and non-convex knob functions

FIG. 4 illustrates the addition of extra points, using a close-up view of part of FIG. 3. Based on existing points labelled 3 and 4, horizontal (301) and vertical (302) lines are drawn. To find new points that will be between 3 and 4 in the knob function, only the points in the triangle formed by these two lines and the straight line joining points 3 and 4 need be considered. Of these, point 3A is the only one that meets the property. Point 3A is therefore added to the knob function. The two remaining points in the triangle both have higher error and higher processing time than point 3A, so are not added. No new points between 4 and 5 are available. Points 5A and 5B meet the required property and are therefore added to the knob function between existing points 5 and 6.

Another modification that may be desirable to a knob function is illustrated by comparing the tables in FIGS. 5 and 6. Each table shows the respective values of 7 parameters, numbered 1 to 7, for 12 points, numbered 0 to 11 on a knob function. The parameter values are such that higher numbers produce lower errors but require longer processing times. In general, therefore, increasing the knob setting will mean each parameter value either stays unchanged or increases. However, this is not always the case.

Consider the function tabulated in FIG. 5. Passing from knob setting 1 to knob setting 2, which should reduce the error and increase the processing time, brings a reduction in parameter 2 from 1 to 0, which, in isolation, would have the opposite effect. However, for the function tabulated in FIG. 5, the error reduction and processing time increase due to the increases in parameters 3 and 7 more than offsets this. For some processes, this local lack of monotonicity in parameter values may be undesirable because it increases the likelihood that the overall monotonic behaviour of the knob may not be maintained with real (rather than reference) input data. It is often possible to design a knob function that may be slightly sub-optimal but which meets a stronger monotonicity criterion, that each parameter value should be monotonic with respect to the knob setting. The table in FIG. 6 shows such a modified knob function.

Figure 8:
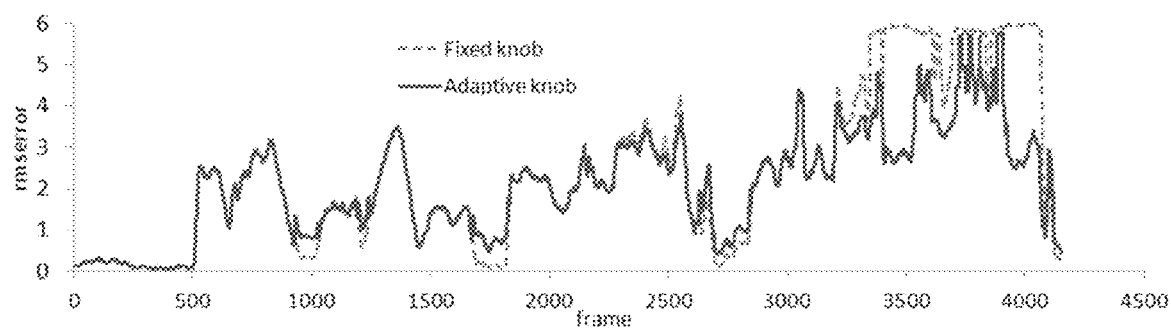
FIG. 8 is a graph illustrating a benefit of the invention

The difference between the knob function of Table 4 and the knob function of Table 5 is illustrated in FIG. 8. This figure shows the points on the two knob functions in the two-dimensional cloud space. The points of the 'optimum' function of Table 4 are joined by a solid line, and the points of the 'feature-monotonic' function of Table 5 are joined by a dashed line. The set of parameter values for each point is shown in the figure as a set of numbers enclosed by square brackets. It can be seen that knob positions 1 to 6 of the feature-monotonic function of Table 5 correspond to less than optimum points in the cloud, but have the desired monotonicity in the change in error and processing time for each increment of the knob setting.

As explained the knob function describes a set of optimal parameter settings for processing applied to the reference data for which ground truth process results are available. We now turn to the second part (102) of the invention, the "main processing phase", in which we select processing parameters, from the sets included in the knob function, for processing new data unrelated to the data used in the setup phase. By changing the knob setting during the processing of the new data we can optimise the process.

The main processing phase (102) solves one of two problems for an ensemble of source material, for example a whole programme or film: it either minimizes the overall processing error given a constraint on overall processing time, or it minimizes the overall processing time given a constraint on maximum overall error.

If all source material had the same characteristics as the reference data (103) used for the knob function design, we could solve the problem by using a constant knob setting. Unfortunately, within a given programme there is usually a wide range of source material, ranging from "easy" material (for example, a very slow-moving picture with little detail) to "difficult" material (for example, a highly detailed picture with fast, complex motion). When the knob function is applied to different categories of source material, different error/time characteristics will emerge that do not correspond with the previously stored data in the cloud (111).

With some assumptions, it is possible to derive a law for the optimal operation of a given knob function so as to optimise the parameters of a process according to the characteristics of the input data being processed. Here, we first consider the case where the overall processing time is constrained and we are trying to minimize the overall error. In the analysis that follows, the video sequence to be processed is divided into "clips" which may correspond with scenes or shots. Within a clip, a constant knob setting will be used, but between clips the knob setting may be varied. Note that in this analysis the mean squared error, rather than the RMS error, is used as the error measure.

Suppose that, given knowledge about a particular clip, the error/time characteristic is known. In particular, suppose that for each clip i the mean square error e is linked to processing time t by a function $$e = f_i(t) \qquad (1)$$

and the processing time per frame t is linked to the knob setting k by a function (assumed here to be a continuous function)

$$t = g_i(k) \quad (2)$$

If each clip has $M_i$ frames, then the total squared error for the whole input video sequence, where each clip is weighted according to its length, is $$E = \sum_{i=1}^{N} M_i f_i(t_i) \quad (3)$$

and we wish to choose $k_i$, the knob setting for each clip, to minimize E subject to a total processing time constraint:

$$T = \sum_{i=1}^{N} M_i t_i \quad (4)$$

Through equation (2) we can choose a knob setting for a clip by choosing an appropriate processing time for the clip.

Using the method of Lagrange multipliers, the equations to solve are therefore:

$$\frac{\partial E}{\partial t_i} + \lambda \frac{\partial T}{\partial t_i} = M_i \left( \frac{\partial f_i}{\partial t_i} + \lambda \right) = 0 \quad (5)$$

so $$\frac{\partial f_i}{\partial t_i} = -\lambda \quad (6)$$

This means that we should choose a knob setting for each clip so that the gradient of the error/time function is a constant value for all the clips that comprise the video sequence to be processed.

In practice, we do not know the functions linking error to processing time, and linking knob setting to processing time, for each clip. However, it is possible to make an estimate, given some measured information about the clip. An example will now be given, again with some simplifying assumptions.

We now suppose that the processing time depends only on the knob setting and not on the source material. We therefore have a single known function that expresses the processing time in terms of the knob setting:

$$t = g(k) \quad (7)$$

A useful approximation to the relationship (in the knob function) between processing time and mean square error is to express it as a hyperbola with fixed offsets:

$$e - e_0 = \frac{A}{t - t_0} \quad (8)$$

where A is a constant.

We now suppose that the actual mean squared error is related linearly to equation (8) via a measured mean square temporal activity function $h_i$ of the input data:

$$e_i = \left(\frac{h_i}{H}\right)\left[\left(\frac{A}{t_i - t_0}\right) + e_0\right] \quad (9)$$

where H is a constant.

Then, referring to the derivation above, $$f_i(t_i) = \left(\frac{h_i}{H}\right)\left[\left(\frac{A}{t_i - t_0}\right) + e_0\right] \quad (10)$$

$$\frac{\partial f_i}{\partial t_i} = -\lambda \quad (11)$$

Differentiating (10):

$$\frac{h_i A}{H(t_i - t_0)^2} = \lambda \quad (12)$$

$$t_i = t_0 + \sqrt{\frac{\lambda H}{h_i A}} \quad (13)$$

To obtain λ, we find the time to process the whole video sequence, and apply the time constraint T from equation 4:

$$T = \sum_{i=1}^{N} M_i t_i = M t_0 + \sqrt{\frac{\lambda H}{A}} \sum_{i=1}^{N} \sqrt{\frac{1}{h_i}} \quad (14)$$

where $M = \sum_{i=1}^{N} M_i$, the total number of frames in the input video sequence.

Solving for λ:

$$\lambda = \frac{A}{H} \left( \frac{T - M t_0}{\sum_{i=1}^{N} \sqrt{\frac{1}{h_i}}} \right)^2 \quad (15)$$

Then, given λ and the function g(k) linking knob setting to processing time, we arrive at a knob setting for each clip $$k_i = g^{-1}\left( t_0 + \sqrt{\frac{\lambda H}{h_i A}} \right) \quad (16)$$

The knob setting returned by Equation (16) will in general be a non-integer number which should be rounded to the nearest integer for use to control the process.

Suitable values for the constants defining the assumed shape of the hyperbola that describes the knob function's relationship between the mean square error and the processing time are

A=400

$t_0$=275

$e_0$=8.75

And, a suitable value for the constant H that scales the value of the temporal activity measure $h_i$ is 500, when $h_i$ is a mean-square inter-frame pixel value difference, evaluated for 8-bit luminance values.

Now suppose that we wish to choose $k_i$, the knob setting for each clip, to minimize the total processing time T subject to a total average mean square error constraint E expressed by Equation 3. Again using the method of Lagrange multipliers, the equations to solve are $$\mu \frac{\partial E}{\partial t_i} + \lambda \frac{\partial T}{\partial t_i} = M_i \left( \mu \frac{\partial f_i}{\partial t_i} + 1 \right) = 0 \quad (17)$$

so $$\frac{\partial f_i}{\partial t_i} = -\frac{1}{\mu} = -\lambda \quad (18)$$

Note that Equation 18 is identical to Equation 6, since $\mu$ is an arbitrary constant whose value needs to be determined and which has therefore here been expressed as the reciprocal of $\lambda$. This means that, just as for the time-constrained case, we should choose knob settings for each clip that correspond with processing times where the gradient of the error/time function is constant for all clips in the sequence.

We now follow the reasoning of Equations 14 to 16 inclusive to determine knob settings for the error-constrained case:

Across the whole sequence:

$$E = \sum_{i=1}^{n} M_i f_i(t_i) \quad (21)$$

$$= \sum_{i=1}^{N} M_i \frac{h_i}{H} \left( \frac{A}{t_i - t_0} + e_0 \right)$$

$$= \sum_{i=1}^{N} M_i \frac{h_i}{H} \left( \frac{A}{\sqrt{\frac{\lambda H}{h_i A}}} + e_0 \right)$$

Solving for $\lambda$:

$$\lambda = \left( \frac{\left( \frac{A}{H} \right)^{\frac{3}{2}} \sum_{i=1}^{N} M_i h_i^{\frac{3}{2}}}{E - \frac{e_0}{H} \sum_{i=1}^{N} M_i h_i} \right)^2 \quad (22)$$

Equation 16 can then be applied directly to this value of $\lambda$ to determine the knob settings for each clip.

Returning to FIG. 2, the application of the main phase (102) of the invention to the processing of a video sequence will now be described. The sequence to be processed (114) is applied to an activity measurement circuit (115), which divides the sequence into clips and forms a measure of the temporal activity (116) for each clip. The clip boundaries could be defined by metadata associated with the video sequence (114), or the activity measurement circuit (115) could include a known shot-change detector to identify the start and end points of clips. A suitable temporal activity measure is a sum of inter-frame pixel value differences for the frames of a clip.

The activity value (116) for each clip, together with the parameter values for each knob setting (113) calculated according to the setup phase (101), is applied to a knob setting circuit (117) which implements Equations (15) and (16) above to determine a knob setting $k_i$ for each clip i. The set of parameter values (118) corresponding to $k_i$ are passed to the process (119), which acts on the video sequence input data (114) according to the parameter settings (118) to produce a final processed video output (120). As the skilled person will appreciate, it may be necessary to delay the start of the processing to allow for the time taken to derive the activity measures (116).

Even if the knob setting is not adjusted automatically during the processing, it still provides an improved manual control interface for the operator of the process. The monotonic variation of processing time and processing error with knob setting makes possible intuitive control of the process. The operator can respond to whatever information is conveniently available about the inputs to, outputs from, and progress of the process; he can then change the tradeoff between time and accuracy as he sees fit by adjusting the knob.

As explained above, where it is possible to estimate the slope of error/time relationship from a measurement of the characteristics of the input data to the process, for example as in equation 15, or equation 22 above, the invention provides a method of optimising the process, by automatically adjusting the knob setting. This optimisation can give priority to achieving a certain quality of processing, that is to say a certain minimum error; or, the optimisation can give priority to achieving a certain speed of processing, that is to say a certain total time to process a given quantity of data.

If a processing time constraint, represented as a time constraint, applies, then equation 15 determines the required slope $\lambda$ of the error/time relationship. If a total error constraint applies, then equation 22 determines the required slope. In either case, equation 16 determines the required knob setting that comprises the input to the novel one-dimensional control function.

Figure 7:
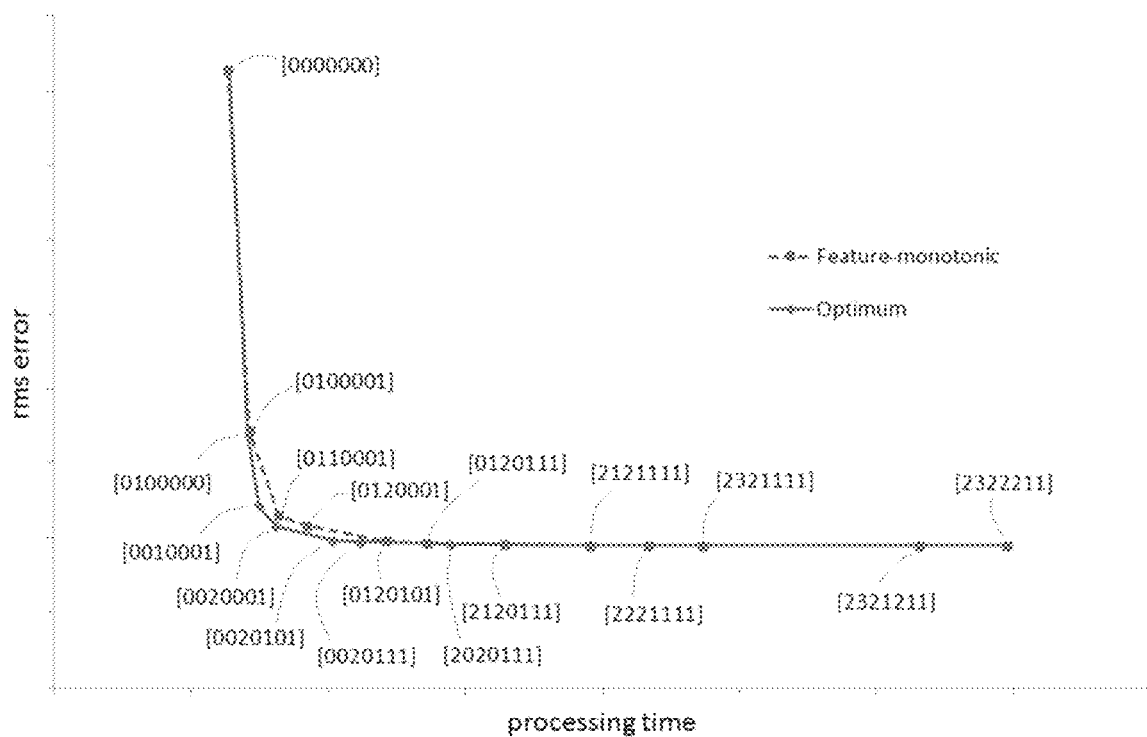
FIG. 7 shows the knob functions of Tables 4 and 5 in performance/time space.

An example illustrating the benefit of adapting the knob setting according to temporal activity in the main processing phase (102) of the invention is given in FIG. 7. In this example the process is optimised to meet a processing time constraint.

Two graphs of RMS error against time are shown for a three-minute segment of film material consisting of 20 clips. The broken line illustrates the case where the knob setting is fixed throughout the programme at a level calculated to meet a certain overall processing time. The full line illustrates the case where the knob setting is calculated for each clip according to Equations (15) and (16), meeting the same overall processing time constraint. The effect of the adaptive knob has been to increase the RMS error for some clips where it was very low. The processing time is therefore reduced for those clips, and the time saved is made available to reduce the error in parts of the sequence where it was highest. This efficient allocation of the available processing resource with minimal degradation to the processed output is a key advantage of the invention. Note that the RMS error has not been leveled throughout the sequence. This is a consequence of the equations above which seek to equalize the gradients of the error/time functions, rather than the errors themselves.

Other embodiments of the invention may be implemented without departing from the scope of the present description. For example, the setup phase (101) may be carried out for several separate categories of source material, for which the categorization criterion may be the same as the activity measure (115) used in the main processing phase (102). The material may additionally be classified by genre in the setup phase and the appropriate knob function selected in the main processing phase.

The invention claimed is:

1. A video processing apparatus comprising:
   an input for receiving an input video;
   a processor configured to process the input video, in a process having a processing time and a processing error, to provide an output video, the processor adapted to receive a plurality of control parameters, wherein values of the control parameters determine at least in part said processing time and said processing error; and a one dimensional control actuable by a user to select a value of a single control variable, where values of the single control variable are associated in a control function with selected sub-sets of control parameter values, such that each value of the control variable provides a value for each of the control parameters;

wherein increasing values of the control variable result in monotonically decreasing processing errors and monotonically increasing processing time.

2. The apparatus of claim 1, wherein said processor comprises a motion compensated video processor and a motion estimator, said motion estimator being configured to receive said input video and said control parameters and to derive motion vectors in a motion estimation process controlled by at least some of said control parameters, said motion vectors being provided to said motion compensated video processor.

3. The apparatus of claim 1, wherein the control function is defined in a set-up mode by:
generating points in error/time space corresponding to multiple combinations of control parameter values applied to a reference input video applied to the processor;
selecting a subset of points in which each point is such that all other points in the space have either a higher processing error or a higher processing time; and
associating with the values of the control variable only the respective combinations of control parameter values corresponding to the selected subset.

4. A video processing apparatus comprising:
a processor receiving a video input, the processor being controlled by a plurality of control parameters to operate a process having a processing error and a processing time;
an activity detector providing a measure of activity in the video input; and
a controller which receives the measure of activity and in response to the measure of activity selects a value for a one dimensional control variable from a set of predetermined values, where the predetermined values of the control variable are associated in a control function with selected sub-sets of control parameter values, such that each value of the control variable provides a value for each of the control parameters;
wherein increasing values of the control variable result in monotonically decreasing processing error and monotonically increasing processing time
wherein the controller provides to the processor a value for each of the plurality of control parameters, in accordance with the selected value of the control variable; and
wherein processor operates a process having a processing error and a processing time, both determined by the selected value of the control variable.

5. The apparatus of claim 4, wherein said processor comprises a motion compensated video processor and a motion estimator, said motion estimator being configured to receive said input video and said control parameters and to derive motion vectors in a motion estimation process controlled by at least some of said control parameters, said motion vectors being provided to said motion compensated video processor.

6. The apparatus of claim 4, wherein the control function is defined in a set-up mode by:
generating points in error/time space corresponding to multiple combinations of control parameter values applied to a reference input video applied to the processor;
selecting a subset of points in which each point is such that all other points in the space have either a higher processing error or a higher processing time; and
associating with the values of the control variable only the respective combinations of control parameter values corresponding to the selected subset.

7. The apparatus of claim 4, wherein the controller is configured to divide the input video into segments and to derive for each segment an estimate of the processing error/processing time function for that segment and to select a segment value for the control variable control for that segment which equalizes the gradient of the function across all segments.

8. The apparatus of claim 7, wherein the value of said equalised gradient is chosen according a required total processing time.

9. The apparatus of claim 7, wherein the value of said equalised gradient is chosen in dependence on a required total error.

10. A non-transient computer program product adapted to cause programmable apparatus to implement a method of processing video, the method implemented by the programmable apparatus and comprising:
receiving, at one or more processors, a video to be processed by a process controlled by a plurality of control parameters and having a processing error and a processing time;
providing a one-dimensional control function for controlling said process in order to affect the outcomes of processing time and processing error, said control function being defined by:
generating points in error/time space corresponding to multiple combinations of control parameter values applied to a reference input video applied to the process,
selecting a subset of points in which each point is such that all other points in the space have either a higher error or a higher time, and
associating with values of a control variable only the respective combinations of parameter values corresponding to the selected subset,
wherein increasing values of the control variable result in monotonically decreasing processing error and monotonically increasing processing time;
selecting a value for said control variable;
supplying to the processor the combination of parameter values associated by said control function with the selected value for the control variable; and
performing the process on the video, such that the processing time is determined by said combination of parameter values.

11. The computer program product according to claim 10, wherein the error/time gradients of lines between adjacent points in the subset form a monotonically increasing or decreasing sequence.

12. The computer program product according to claim 10, wherein the subset is modified so that the values of each control parameter are individually monotonically increasing or decreasing with respect to error or to time.

13. The computer program product according to claim 10, wherein a property is estimated from the video and the control variable is selected according to a value of the property.

14. The computer program product according to claim 10, wherein the video is divided into segments and, for each segment, an estimate of the processing error/time function for that segment is made and the value of the control variable is selected for each segment to equalize the gradient of the function across all segments.

15. The computer program product according to claim 14, wherein the value of said equalised gradient is chosen in dependence on a required total processing time.

16. The computer program product according to claim 14, wherein the value of said equalised gradient is chosen in dependence on a required total processing error.

17. The computer program product according to claim 10, wherein said processor comprises a motion compensated video processor and a motion estimator, said motion estimator being configured to receive said video and said control parameters and to derive motion vectors in a motion estimation process controlled by at least some of said control parameters, said motion vectors being provided to said motion compensated video processor.

* * * * *